(12) United States Patent
Lee (10) Patent No.: US 7,975,975 B2
(45) Date of Patent: Jul. 12, 2011

(54) IMAGE DISPLAY DEVICE (75) Inventor: Jin Woo Lee, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 12/277,034

(22) Filed: Nov. 24, 2008

(65) Prior Publication Data

US 2009/0073646 A1 Mar. 19, 2009

Related U.S. Application Data

(62) Division of application No. 11/079,182, filed on Mar. 15, 2005, now abandoned.

(30) Foreign Application Priority Data

Mar. 16, 2004 (KR) .............................. P2004-17629

(51) Int. Cl.
*E04G 3/00* (2006.01)
*G06F 1/16* (2006.01)

(52) U.S. Cl. ............... 248/278.1; 248/125.9; 248/176.1; 248/923; 361/679.06; 361/679.21

(58) Field of Classification Search ............... 248/125.2, 248/125.9, 176.3, 276.1, 278.1, 295.11, 676, 248/919, 922, 923, 176.1; 361/679.05, 679.22, 361/679.41, 679.06, 679.21, 679.59
See application file for complete search history.

(56) References Cited

U.S. PATENT DOCUMENTS

| | | | |
|---|---|---|---|
| 1,509,759 A | 9/1924 | Huber | |
| 2,505,075 A | 8/1947 | Weinberger et al. | |
| 4,071,174 A | 1/1978 | Weiner et al. | |
| 4,438,458 A | 3/1984 | Munscher | |
| 5,751,548 A * | 5/1998 | Hall et al. | 361/679.41 |
| 6,134,103 A * | 10/2000 | Ghanma | 361/679.05 |
| 6,229,584 B1 * | 5/2001 | Chuo et al. | 349/58 |
| 6,394,403 B1 * | 5/2002 | Hung | 248/276.1 |
| 6,418,010 B1 * | 7/2002 | Sawyer | 361/679.05 |
| 6,478,275 B1 * | 11/2002 | Huang | 248/284.1 |
| 6,505,988 B1 | 1/2003 | Oddsen, Jr. et al. | |
| 6,517,040 B1 * | 2/2003 | Wen | 248/278.1 |
| 6,554,238 B1 * | 4/2003 | Hibberd | 248/278.1 |
| 6,708,940 B2 * | 3/2004 | Ligertwood | 248/324 |
| 6,752,363 B2 | 6/2004 | Boele et al. | |
| 6,822,857 B2 | 11/2004 | Jung et al. | |
| 6,874,743 B2 | 4/2005 | Watanabe et al. | |
| 7,068,497 B2 | 6/2006 | Chu et al. | |
| 7,068,947 B2 * | 6/2006 | Mahlab | 398/183 |
| 7,072,175 B2 * | 7/2006 | Ho | 361/679.21 |
| 7,130,186 B2 | 10/2006 | Yu et al. | |

(Continued)

FOREIGN PATENT DOCUMENTS

| | | |
|---|---|---|
| CN | 2599710 Y | 1/2004 |
| JP | 01-105286 A | 4/1989 |
| JP | 2000-244146 A | 9/2000 |
| WO | WO-99/61808 A1 | 12/1999 |

*Primary Examiner* — Tan Le
(74) *Attorney, Agent, or Firm* — Birch, Stewart, Kolasch & Birch, LLP (57) ABSTRACT

An image display device includes a body for displaying an image, a position adjusting device at a rear of the body for adjusting a height, a left/right angle, and a forward/backward slope of the body, a base, a support having an upper end rotatably coupled to the position adjusting device and a lower end rotatably coupled to the base, and a seating recess in an upper surface of the base for folding and placing the support therein, thereby permitting adjustment of the height, the left/right angle, and the forward/backward slope of the body.

11 Claims, 8 Drawing Sheets

U.S. PATENT DOCUMENTS

| | | | |
|---|---|---|---|
| 7,607,620 B2 * | 10/2009 | Ozolins et al. | 248/122.1 |
| 7,731,135 B2 * | 6/2010 | Richter | 248/125.9 |
| 2002/0140875 A1 | 10/2002 | Ho | |
| 2003/0075649 A1 * | 4/2003 | Jeong et al. | 248/157 |
| 2003/0154673 A1 | 8/2003 | MacGregor et al. | |
| 2009/0073646 A1 * | 3/2009 | Lee | 361/679.22 |

* cited by examiner

IMAGE DISPLAY DEVICE

CROSS-REFERENCE TO RELATED APPLICATION

This application is a division of application Ser. No. 11/079,182, filed on Mar. 15, 2005 now abandoned, which claims the benefit of Korean Application No. P2004-0017629 filed on Mar. 16, 2004, which is hereby incorporated by reference as if fully set forth herein.

BACKGROUND OF THE INVENTION

1. Field of the Invention

The present invention relates to a stand of an image display device, and more particularly, to a stand in which adjustment of a height, a left/right angle, and a forward/backward slope of an image display device body is made possible.

2. Discussion of the Related Art

Figure 1:
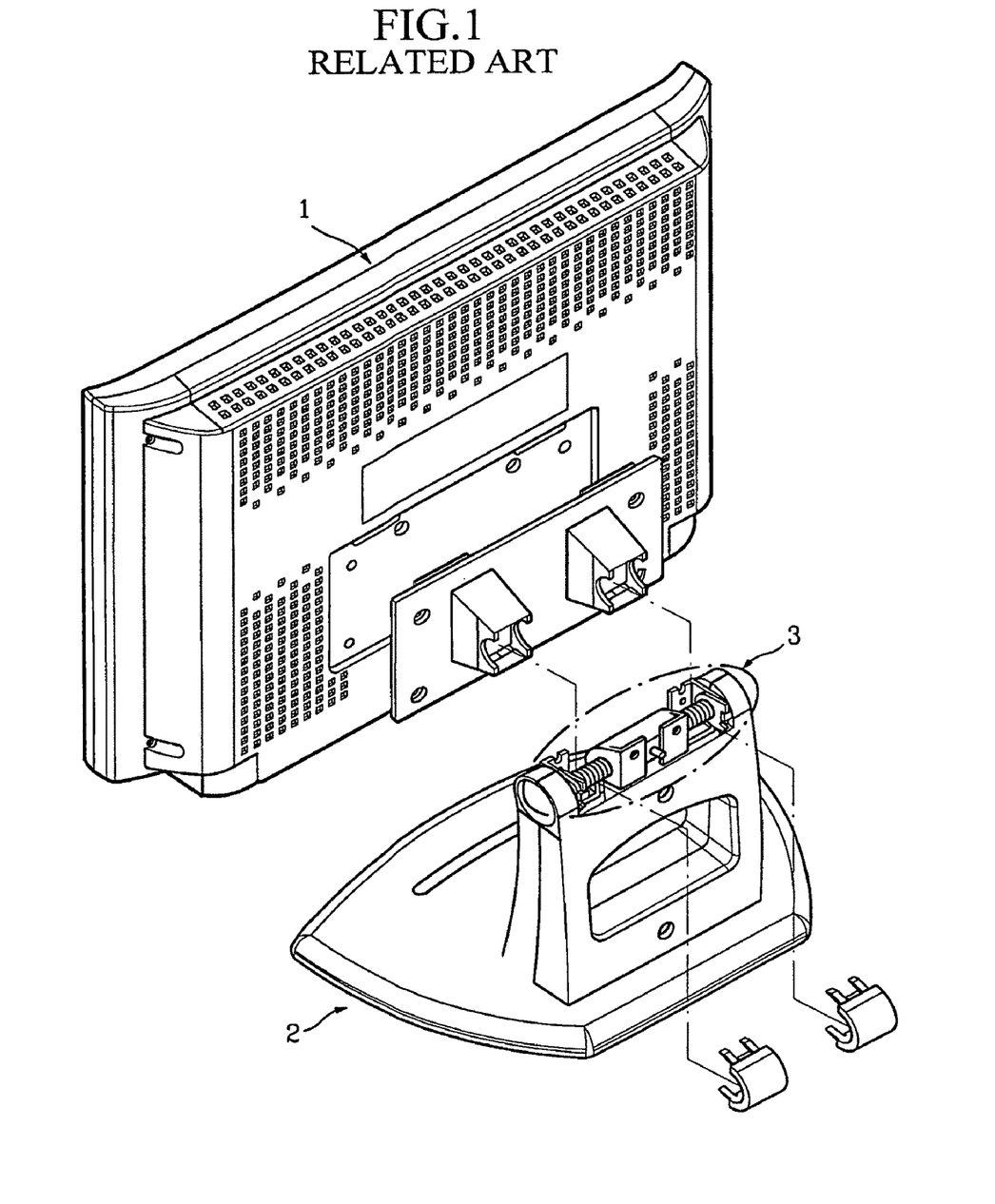
FIG. 1 illustrates a perspective view of a related art image display device.

FIG. 1 illustrates a perspective view of a related art image display device. Referring to FIG. 1, the related art image display device is provided with a body 1, a base 2, and a hinge assembly 3. The body 1 displays an image, and the base 2 supports a load of the body 1. The hinge assembly 3 at a top of the base 2 enables the body 1 to rotate in a forward/backward direction. That is, the user adjusts the forward/backward slope of the body 1 by using the hinge assembly 3.

The related art image display device has several problems. First, the hinge assembly 3 has many components, such as a plurality of friction springs or torsion springs, washers, nuts, and so on, that require much time for fabrication. Second, the related art image display device can be adjusted only in the forward/backward direction of the body by using the hinge assembly. That is, even if required, the height and the left/right angle of the body cannot be adjusted.

SUMMARY OF THE INVENTION

The present invention is directed to an image display device that substantially obviates one or more problems due to limitations and disadvantages of the related art.

An object of the present invention is to provide an image display device, in which adjustment of a height, a left/right angle, and a forward/backward slope of a body thereof displaying an image is made possible.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages, and in accordance with the purpose of the invention, as embodied and broadly described herein, an image display device includes a body for displaying an image, a position adjusting device at a rear of the body for adjusting a height, a left/right angle, and a forward/backward slope of the body, a base, and a support having an upper end rotatably coupled to the position adjusting device and a lower end rotatably coupled to the base. A seating recess may be provided in an upper surface of the base for folding and placing the support therein.

The position adjusting device includes a height adjusting device on the rear of the body for moving the body in an up/down direction, a first shaft rotatably coupled to the height adjusting device which functions as a center shaft during left/right angle adjustment of the body, and a second shaft which passes through the first shaft and which is rotatably coupled to the support which functions as a center shaft during forward/backward slope adjustment of the body.

The height adjusting device includes a vertical guide rail on the rear of the body, and a guide block slidably coupled to the guide rail. The guide block includes one pair of brackets at a top and a bottom of a rear thereof, and the first shaft has a top end and a bottom end rotatably coupled to the brackets.

The support has an opening in an upper portion, for preventing interference between the bracket and the support during left/right angle adjustment of the body, as well as interference between the first shaft and the support during forward/backward slope adjustment of the body. The support is hinged at one side of the base.

The image display device further includes a supplementary base at the rear of the base for securely supporting the body during forward/backward slope adjustment of the body. The supplementary base is provided at opposite sides of the rear of the base.

The image display device further includes at least one cord fastener in an underside surface of the base for winding a mouse cord thereon. The cord fastener includes a circular recess in the underside surface of the base, and a reel projected from a center of the recess for winding the mouse cord thereon. The image display device further includes a disc at a bottom of the reel for preventing the mouse cord on the reel from escaping through the bottom of the recess. The recess includes a first guide groove at one side for guiding the mouse cord wound on the reel to a side of the base, and a second guide groove extended from one side to the rear of the base. Preferably, the cord fastener is provided at opposite sides of the underside surface of the base.

It is to be understood that both the foregoing general description and the following detailed description of the present invention are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
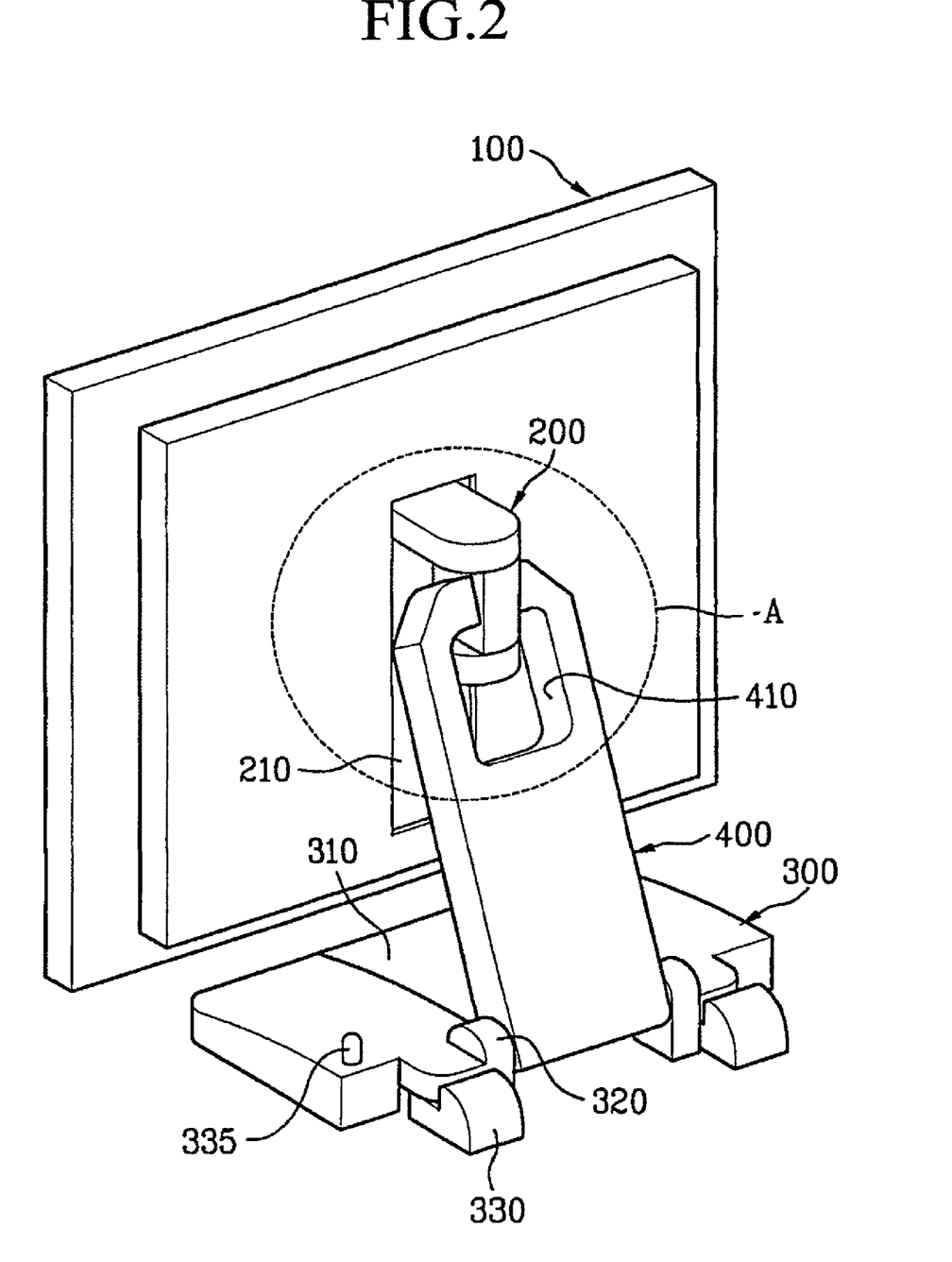
FIG. 2 illustrates a perspective view of an image display device in accordance with a preferred embodiment of the present invention.
Figure 3:
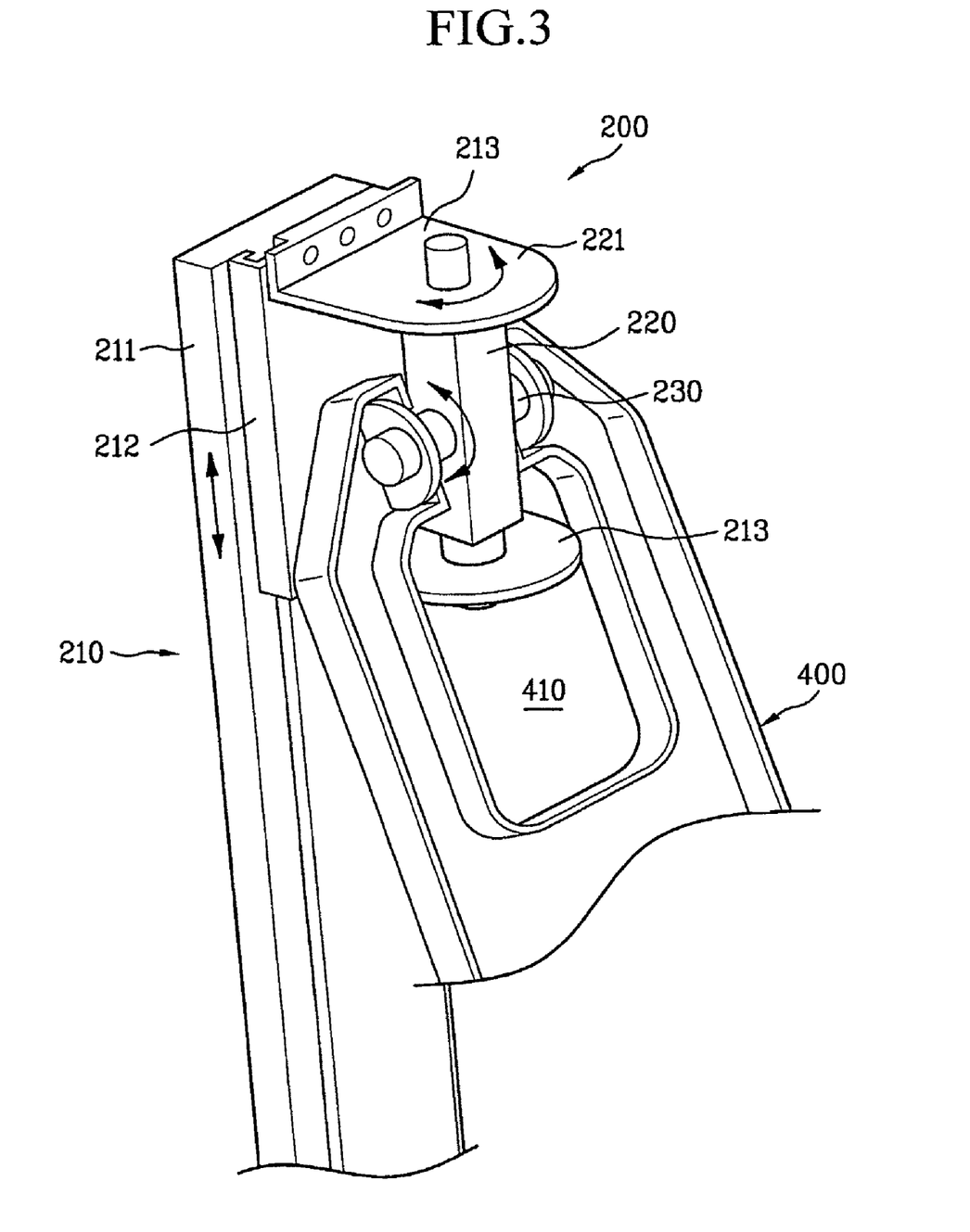
FIG. 3 illustrates a perspective view of a detailed structure of the 'A' part in FIG. 2.

Referring to FIGS. 2 and 3, the image display device includes a body 100, a position adjusting device 200, a base 300, and a support 400. The body 100 may be an LCD monitor, for example, that displays an image, and the position adjusting device 200 is provided to a rear of the body 100 for adjusting a height, a left/right angle, and a forward/backward slope of the body 100. That is, the user adjusts the height, the left/right angle, and the forward/backward slope of the body 100 by using the position adjusting device 200. The base 300 supports a load of the body 100, and may be placed on a horizontal surface such as a desk, table or floor. The support 400 has an upper end rotatably (pivotally) coupled to the position adjusting device 200, and a lower end rotatably (pivotally) coupled to the base 300. The base 300 has a seating recess 310 for receiving the support 400 therein when the support 400 is folded with the base 300.

Referring to FIG. 3, the position adjusting device 200 includes a height adjusting device 210, a first shaft 220, and a second shaft 230. The height adjusting device 210 includes a vertical guide rail 211 on a rear surface of the body 100, and a guide block 212 slidably coupled to the guide rail 211. According to this, a height of the body 100 can be adjusted as the guide rail 211 slides along the guide block 212.

The first shaft 220 is rotatably coupled to the height adjusting device 200 acting as a center shaft during left/right angle adjustment of the body 100. The guide block 212 has a pair of brackets 213 at a top and a bottom, to which the first shaft 220 is rotatably coupled. Accordingly, the left/right angle of the body 100 is adjusted as the pair of brackets 213 rotate around the first shaft 220. That is, if the pair of brackets rotate around the first shaft 220, the body 100 also rotates together with the brackets 213.

The second shaft 230 passes through the first shaft 220, and is coupled to the support 400. The second shaft acts as a center shaft during forward/backward slope adjustment of the body 100. The second shaft 230 horizontally crosses the first shaft 220 at a right angle, and has opposite ends rotatably coupled to the support 400. Accordingly, the forward/backward slope adjustment of the body 100 is made as the first shaft 220 is rotated around the second shaft 230 in a forward/backward direction.

The support 400 has an opening 410 in an upper portion, for preventing interference between the bracket 213 and the support 400 during left/right angle adjustment of the body 100, as well as preventing interference between the first shaft 220 and the support 400 during forward/backward slope adjustment of the body 100.

Figure 4:
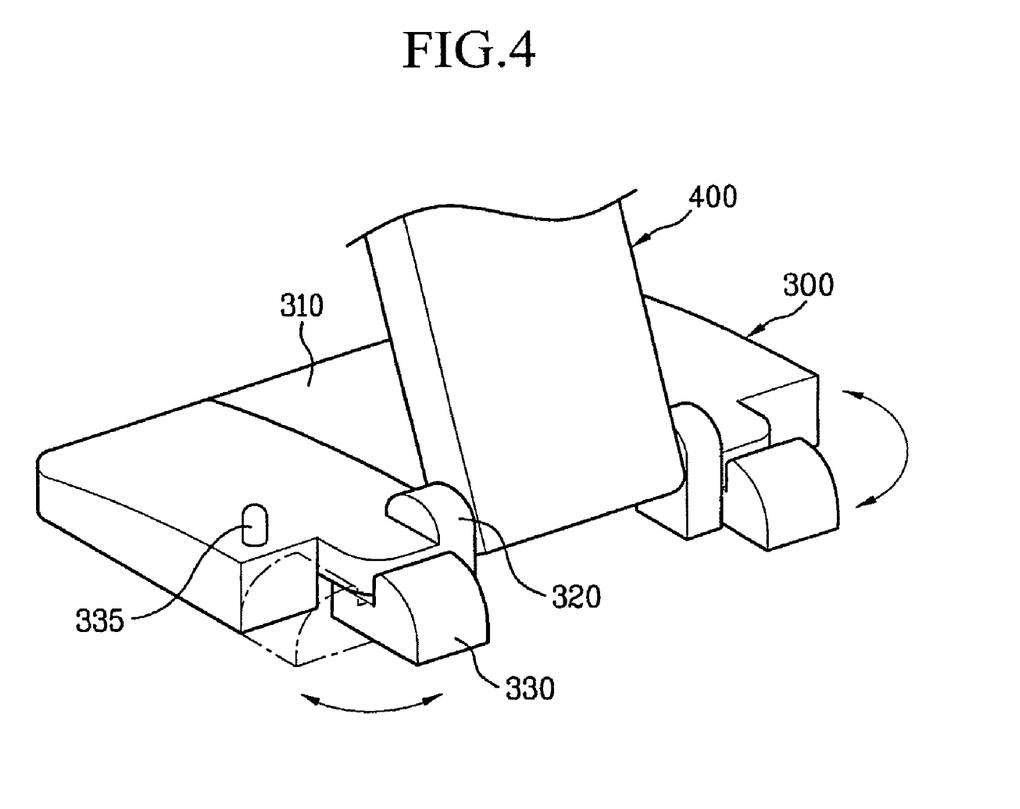
FIG. 4 illustrates a perspective view showing operation of a supplementary base in accordance with a preferred embodiment of the present invention.

Referring now to FIG. 4, the support 400 is hinged at one side of the base 300, such that the support 400 rotates around the hinge 320. When the support 400 is rotated forward and folded onto the base 300, the support 400 is placed in the seating recess 310 in the upper surface of the base 300. In the meantime, there are supplementary bases 330 rotatably coupled to a rear of the base 300 for securely supporting the body 100 and reducing/preventing rearward tipping.

FIG. 4 illustrates a perspective view showing operation of a supplementary base 330 in accordance with a preferred embodiment of the present invention. As shown in FIG. 4, when the body 100 rotates rearwardly of the base 300 (see FIG. 8A or 8B), the supplementary bases 330 pivot rearwardly and extend from folded (stowed) positions on the rear of the base 300 to rearwardly extended (deployed) positions, for securely supporting the body 100. That is, if the body 100 is tilted toward the rear of the base 300, to change a center of gravity of the image display device, the image display device may lose its balance and fall down. In this instance, the supplementary bases 330 extend rearwardly of the base 300, to prevent the image display device from falling down.

The supplementary bases 330 may be configured to deploy automatically or manually. For example, the supplementary bases 330 may include biasing members, such as springs, for biasing the supplementary bases 330 toward a deployed position, and may include a suitable latch mechanism (not shown) for maintaining the supplemental bases 330 in a stowed position. Actuation of the latch mechanism and deployment of the supplementary bases 330 may be triggered, for example, manually by depressing a button 335, or automatically according to the angular position of the support 400 when the support 400 is pivoted rearwardly to a point where tipping of the apparatus is imminent. Alternatively, the supplementary bases 330 may simply be manually movable back and forth between stowed and deployed positions, without the use of springs, latches, etc.

The supplementary bases 330 are provided to rotate by an angle of approximately 90°, respectively. Of course, the supplementary bases 330 may even be designed to rotate more than 180°. It is preferable that the supplementary bases 330 are provided to opposite sides of the rear of the base 300 for maintaining a more secure balance of the body 100.

Figure 5:
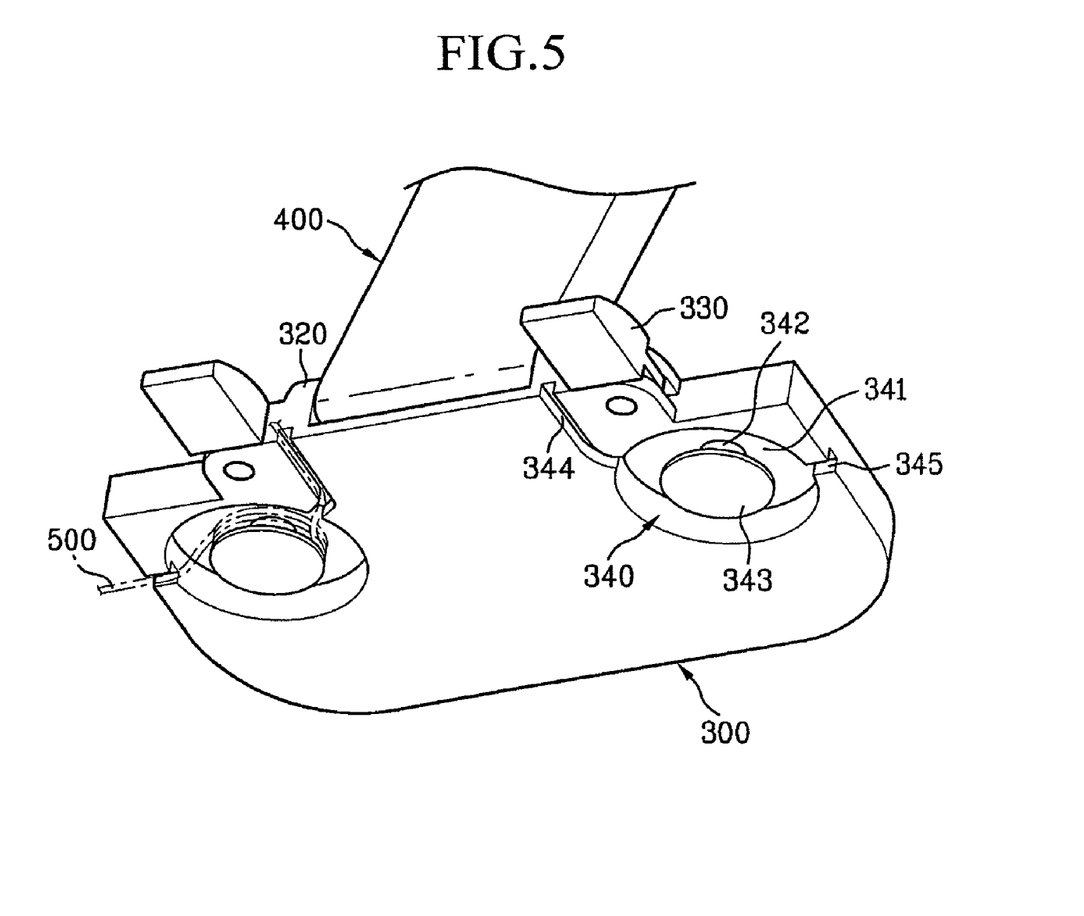
FIG. 5 illustrates a perspective view showing an underside of the base in accordance with a preferred embodiment of the present invention.

FIG. 5 illustrates a perspective view showing an underside of the base 300 in accordance with a preferred embodiment of the present invention. Referring to FIG. 5, there is at least one cord fastening unit 340 in an underside of the base 300 for winding a mouse cord, keyboard, or other cord thereon. The cord fastening unit 340 includes a circular recess 341 in the underside surface of the base 300, and a reel 342 projected from a center of the recess 341, for winding a mouse cord 500 thereon.

A disc 343 is located at a bottom of the reel 342 for preventing the mouse cord 500 on the reel 342 from escaping from the bottom of the reel 342. Accordingly, even if the image display device is moved in a state where the base 300 is lifted from the supporting surface for packaging, the mouse cord 500 on the reel 342 is caught at the disc 343, and cannot escape from the reel 342.

A first guide groove 345 extends from one side of the recess 341 toward a side of the base. Therefore, the mouse cord 500 on the reel 342 may be drawn from the side of the base 300 through the first guide groove 345. Moreover, there is a second guide groove 344 extended from one side of the recess 341 toward the rear of the base 300. Therefore, the mouse cord 500 may be wound on the reel 342 in the underside surface of the base 300 through the second guide groove 344, and drawn from the side of the base 300 through the first guide groove 345 as long as necessary.

The cord fastening unit 340 is provided for clearing away unnecessary mouse cord 500. That is, if the mouse cord 500 is unnecessarily long, the extra mouse cord 500 is wound on the reel 342 in the cord fastening unit 340, for preventing inconvenience caused by an unnecessarily long mouse cord 500.

The cord fastening unit 340 may be in opposite portions of the rear of the base 300. In this case, the user may draw the mouse cord 500 from the left or right side of the base 300 for a right-handed or left-handed user.

Figure 6:
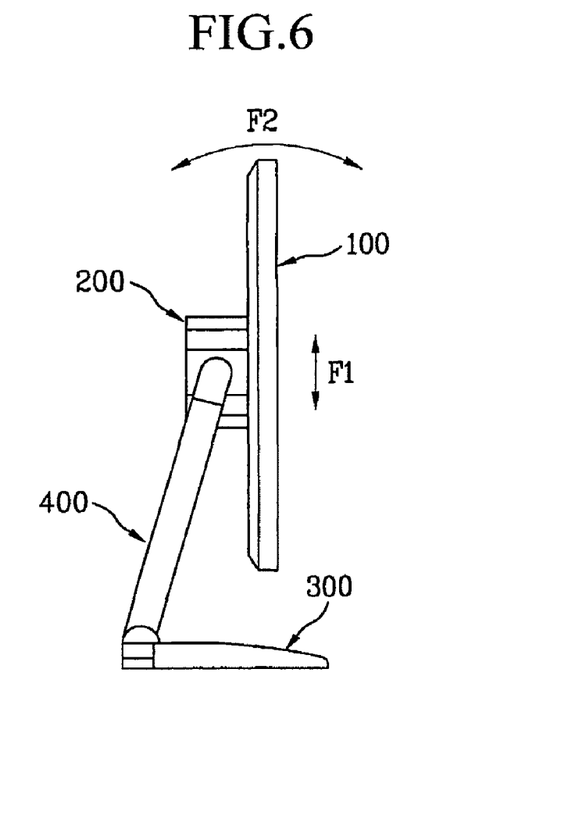
FIG. 6 illustrates a diagram showing height adjustment, and forward/backward slope adjustment of a body in accordance with a preferred embodiment of the present invention.

The operation of the image display device of the present invention will now be described. FIG. 6 illustrates a diagram showing height adjustment, and forward/backward slope adjustment of the body 100 in accordance with a preferred embodiment of the present invention.

Referring to FIG. 6, when it is intended to adjust a height of the body 100, a the user applies force in an F1 direction. In this instance, the guide block 212 slides along the guide rail 211 on the rear of the body 100, to move the body 100 upward or downward, thereby adjusting a height of the body 100.

If the user pushes or pulls the body 100 in an F2 direction for adjusting the forward/backward slope of the body 100, the first shaft 220 rotates around the second shaft 230 in a forward/backward direction of the base 300, and the support 400 pivots about the hinge 320 of the base 300. In this instance, as the body 100 rotates in the forward/backward direction of the base 300, the forward/backward slope of the body 100 is adjusted.

If the body 100 rotates rearward of the base 300, a center of gravity of the body 100 moves rearward of the base 300 and the body 100 may begin leaning. In this condition, the body 100 is liable to fall down rearwardly of the base 300. In this instance, referring to FIG. 4, the supplementary bases 330 at the rear of the base 300 are manually or automatically extended as described above. Therefore, even if the center of gravity of the body 100 moves rearwardly of the base 300, the body 100 can be balanced by the supplementary bases 330.

Figure 7:
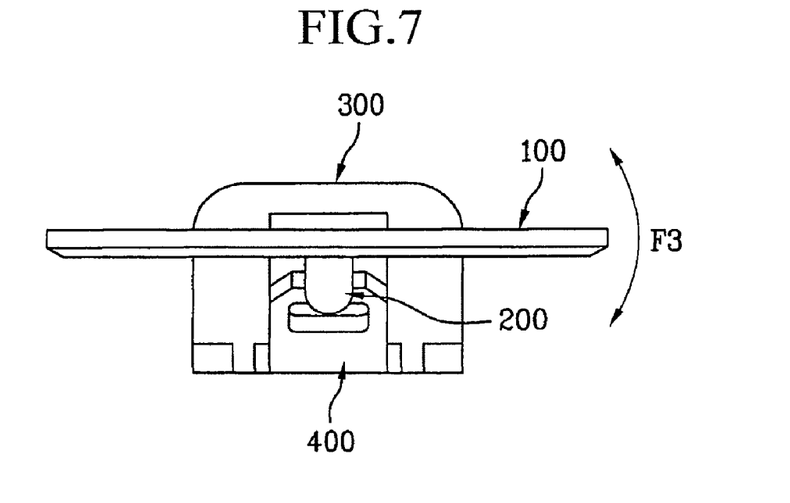
FIG. 7 illustrates a diagram showing left/right angle adjustment of a body in accordance with a preferred embodiment of the present invention.

FIG. 7 illustrates a diagram showing left/right angle adjustment of a body in accordance with a preferred embodiment of the present invention. Referring to FIG. 7, if the user applies a force to the body 100 in an F3 direction for adjusting the left/right angle of the body 100, the brackets 213 at the top and the bottom of the rear of the guide block 212 rotate around the first shaft 220. In this instance, the body 100 rotates in the left/right direction to adjust the left/right angle of the body 100.

The present invention also allows the user to minimize a bulk of the image display device for mounting the device on a wall or for packing. FIGS. 8(a)-8(d) show the steps of a process for minimizing a bulk of the image display device in accordance with a preferred embodiment of the present invention, and FIG. 9 illustrates a diagram showing the image display device in accordance with a preferred embodiment of the present invention mounted on a wall.

Figure 8A:
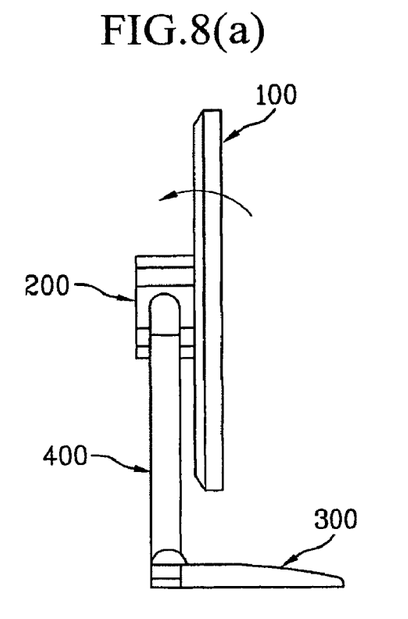
FIGS. 8(a)-8(d) show the steps of a process for minimizing a bulk of an image display device in accordance with a preferred embodiment of the present invention.
Figure 8B:
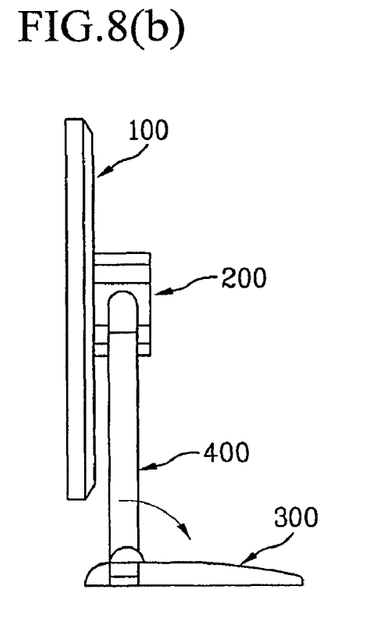
Figure 9:
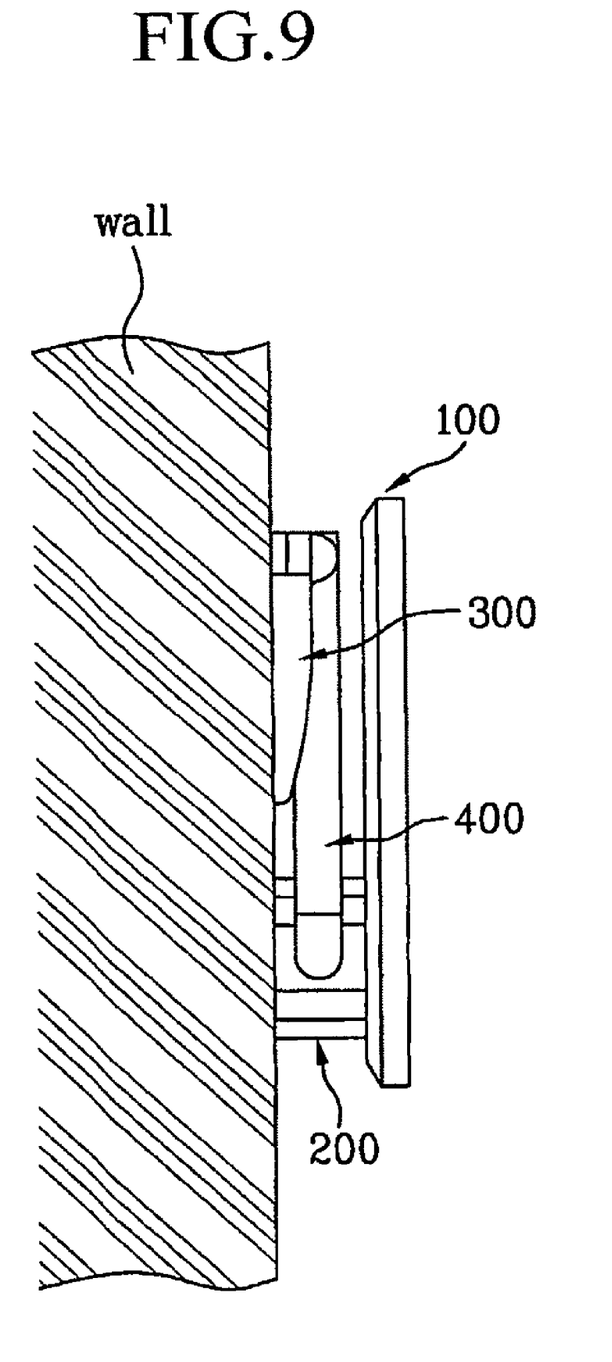
FIG. 9 illustrates a diagram showing an image display device in accordance with a preferred embodiment of the present invention mounted on a wall.

Referring to FIG. 8A, the body 100 is rotated about the support 400 by approximately 180° to bring the body 100 to a position rearward of the base 300 as shown in FIG. 8B. In this instance, as described before, the supplementary bases 330 stretch rearwardly of the base 300 to maintain balance of the body 100.

Next, as shown in FIG. 8B, the support 400 is rotated toward the base 300 by approximately 90°, until the support 400 is placed in the seating recess 310 in the upper surface of the base 300.

Figure 8C:
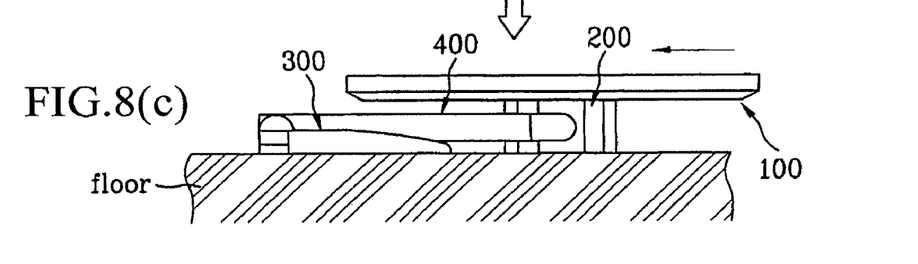

Then, referring to FIG. 8C, the body 100 is pushed in an arrow direction, to minimize the height of the body 100. In this instance, the supplementary bases 330 are returned to their original positions. Of course, by changing a sequence, after minimizing the height of the body 100 at first, the support 400 may be placed in the seating recess 310.

Figure 8D:
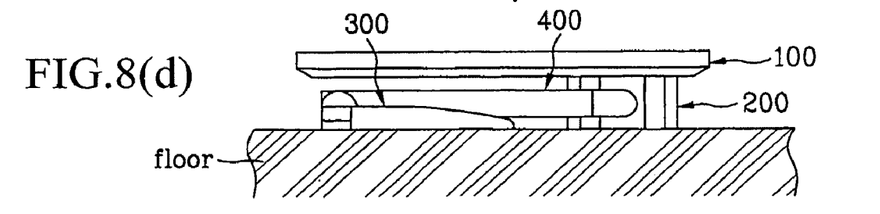

Referring to FIG. 8D, upon finishing such a process, the image display device is in a state where the body 100, the support 400, and the base 300 are stacked in succession substantially parallel with one another, to minimize an entire bulk of the image display device.

Referring to FIG. 9, the user may mount the image display device having the bulk thereof minimized on a wall for use. The user may mount the image display device on the wall and still use the reel 342 and the disc 343 of the cord fastening unit 340 in the underside surface of the base 300.

If the user uses a mouse, an unnecessary length of the mouse cord 500 is wound on the reel 342 of the cord fastening unit 340, to use only a necessary length of the mouse cord 500. In more detail, the unnecessary length of the mouse cord 500 connected to a computer (not shown) is wound on the reel 342 through the second guide groove 344 of the cord fastening unit 340. The necessary length of the mouse cord 500 is drawn from the base 300 through the first guide groove 345. According to this, the interference of the unnecessary mouse cord 500 with a user's work is prevented.

The image display device of the present invention has several advantages. First, the user can move the body 100 to a desired position by using a position adjusting device at a rear of the body 100. That is, the user can move the height, the left/right angle, and the forward/backward slope of the body 100 as the user likes. Second, because a complex hinge assembly is not used, the position adjusting device of the present invention is easy to fabricate, and costs less. Third, even if the body 100 is rotated backward, the balance of the body 100 can be maintained by means of the supplementary bases 330. Therefore, user satisfaction of the product can be improved. Fourth, since the bulk of the image display device can be minimized, a space can be used effectively when the image display device is packed, or mounted on a wall. Fifth, the possibility of clearing an unnecessary length of mouse cord by using the cord fastening unit 340 permits effective work of the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An image display device, comprising:
a base;
a support having a lower end pivotally coupled to said base;
a body to display an image;
at least one supplementary base located at a rear of said base, said supplemental base being movable between a stowed position and a deployed position for providing supplemental rearward support to said body when said support is pivoted rearwardly by a predetermined amount; and
a position adjusting device pivotally coupled to an upper end portion of said support and to the body, said position adjusting device including:
a height adjusting device for attachment to a rear of the body for moving the body in an up/down direction, said height adjusting device includes a vertical guide rail attached to the rear body and a guide block slidably coupled to said guide rail;
a swivel adjusting device including a first shaft rotatably coupled to said guide block for permitting left/right swiveling of the body; and
a tilt adjustment device including a second shaft rotatably coupled to said support for permitting forward/backward tilting of the body, wherein said second shaft intersects with said first shaft at a right angle, and the first shaft rotates around the second shaft when the second shaft rotates.

2. The image display device according to claim 1, wherein said guide block comprises a pair of brackets at a top and a bottom thereof, wherein said first shaft has a top end and a bottom end rotatably coupled to said pair of brackets.

3. The image display device according to claim 2, wherein said support has an opening in an upper portion for preventing interference between said pair of brackets and said support at the time of the left/right angle adjustment of the body, as well as interference between said first shaft and said support at the time of the forward/backward slope adjustment of the body.

4. The image display device according to claim 1, wherein a pair of supplementary bases are provided at opposite sides of said rear of said base.

5. The image display device according to claim 1, further comprising at least one cord fastener located in an underside surface of said base for winding a mouse cord thereon.

6. The image display device according to claim 5, wherein said cord fastener comprises:

a recess in said underside surface of said base;

a reel projected from a center of said recess for winding the mouse cord thereon; and a disc located at a bottom of said reel for preventing the mouse cord on said reel from escaping from said recess.

7. The image display device according to claim 1, wherein said body is a flat panel monitor.

8. The image display device according to claim 7, wherein the flat panel monitor is a liquid crystal display monitor.

9. An image display device, comprising:

a base;

a support having a lower end pivotally coupled to said base;

a body to display an image;

at least one supplementary base located at a rear of said base, said supplemental base being movable between a stowed position and a deployed position for providing supplemental rearward support to said body when said support is pivoted rearwardly by a predetermined amount; and a position adjusting device pivotally coupled to an upper end portion of said support and coupled to the body, said position adjusting device including a first shaft for permitting swiveling about a substantially vertical axis of the body attached thereto, and a second shaft for permitting tilting about a substantially horizontal axis which intersects said substantially vertical axis.

10. The image display device according to claim 9, further comprising a height adjusting device for attachment to a rear of the body for moving the body in an up/down direction.

11. The image display device according to claim 9, further comprising at least one cord fastener located in an underside surface of said base for winding a mouse cord thereon.

* * * * *